United States Patent
Buchanan et al.

(10) Patent No.: US 10,371,228 B2
(45) Date of Patent: Aug. 6, 2019

(54) CONTROL STRATEGY FOR A VARIABLE SPRING RATE ABSORBER

(71) Applicant: BorgWarner Inc., Auburn Hills, MI (US)

(72) Inventors: Mark Buchanan, Rochester Hills, MI (US); Robert Francis Keller, Chesterfield, MI (US); Xiaobing Liu, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 139 days.

(21) Appl. No.: 15/512,858

(22) PCT Filed: Sep. 10, 2015

(86) PCT No.: PCT/US2015/049313
§ 371 (c)(1),
(2) Date: Mar. 21, 2017

(87) PCT Pub. No.: WO2016/048666
PCT Pub. Date: Mar. 31, 2016

(65) Prior Publication Data
US 2017/0248189 A1 Aug. 31, 2017

Related U.S. Application Data

(60) Provisional application No. 62/053,961, filed on Sep. 23, 2014.

(51) Int. Cl.
*F16F 15/00* (2006.01)
*F02D 41/00* (2006.01)

(52) U.S. Cl.
CPC ........ *F16F 15/002* (2013.01); *F02D 41/0097* (2013.01); *F16F 2228/001* (2013.01); *F16F 2230/18* (2013.01)

(58) Field of Classification Search
CPC .. F16F 15/002; F16F 228/001; F16F 2230/18; F02D 41/0097; F02P 5/15; B60G 17/0155; B60G 17/01941; G01Q 60/28
See application file for complete search history.

(56) References Cited

U.S. PATENT DOCUMENTS 4,634,142 A * 1/1987 Woods ............... B60G 17/0155
188/282.2
5,069,476 A * 12/1991 Tsutsumi ......... B60G 17/01941
280/5.508

(Continued)

FOREIGN PATENT DOCUMENTS

CN 1275448 A 12/2000
CN 1424519 A 6/2003

(Continued)

OTHER PUBLICATIONS

Hung et al., Study on a PZT actuator based on pre-stressed mechanism, 2008, IEEE, p. 722-727 (Year: 2008).*

(Continued)

*Primary Examiner* — McDieunel Marc
(74) *Attorney, Agent, or Firm* — BrooksGroup

(57) ABSTRACT

A variable spring rate absorber is adjusted to provide the vibration attenuation characteristics needed to match current operating conditions. Control of a variable spring rate absorber determines the desired absorber spring rate for existing conditions based on a number of inputs and predetermined characterization tables. Once the spring rate is calculated, a predetermined map may be used to determine the absorber setting needed to achieve the desired spring rate. A sensor may be used to measure the actual state of the absorber to determine the extent to which the setting must be adjusted to achieve the desired spring rate.

23 Claims, 3 Drawing Sheets

(56) References Cited

U.S. PATENT DOCUMENTS

| | | | |
|---|---|---|---|
| 5,446,662 | A | 8/1995 | Kojima et al. |
| 6,022,005 | A | 2/2000 | Gran et al. |
| 2007/0035074 | A1 | 2/2007 | Vervoordeldonk et al. |
| 2009/0158828 | A1* | 6/2009 | Baba .................. G01Q 60/28 73/105 |
| 2012/0161411 | A1 | 6/2012 | Ehrlich et al. |
| 2015/0130655 | A1* | 5/2015 | Aizawa .................. G01S 3/74 342/147 |
| 2018/0163650 | A1* | 6/2018 | Serrano .................. F02P 5/15 |

FOREIGN PATENT DOCUMENTS

| | | |
|---|---|---|
| CN | 1846082 A | 10/2006 |
| CN | 103912674 A | 7/2014 |
| EP | 2236854 A1 | 10/2010 |
| JP | 06092123 A | 4/1994 |
| JP | 200065128 A | 3/2000 |

OTHER PUBLICATIONS

Buhr et al., Noncollocated adaptive-passive vibration control using self-tuning vibration absorbers, 1998, IEEE, p. 3460-3464 (Year: 1998).*

Hirose et al., Toyota electronic modulated air suspension system for the 1986 Soarer, 1988, IEEE, p. 193-200 (Year: 1988).*

Lin et al., Toward better ride performance of vehicle suspension system via intelligent control, 1992, IEEE, p. 1470-1475 (Year: 1992).*

International Search Report and Written Opinion; dated Dec. 15, 2015; for International Application No. PCT/US2015/049313; 13 pages.

Schneider et al., U.S. Appl. No. 15/113,085, Torsional Vibration Damper, filed Jul. 21, 2016.

Chinese Office Action dated Jul. 3, 2018; Application No. 201580049401.9; Applicant: BorgWarner Inc.; 18 pages.

Cheng, Daxian Chemical Industry Press; Handbook of Mechanical Design; Jan. 31, 2004; pp. 7-173.

Chinese Office Action dated Mar. 4, 2019; Application No. 201580049401.9; Applicant: BorgWarner Inc.; 22 pages.

* cited by examiner

CONTROL STRATEGY FOR A VARIABLE SPRING RATE ABSORBER

CROSS-REFERENCE TO RELATED APPLICATIONS

This application claims the benefit of the U.S. Provisional Application No. 62/053,961 filed Sep. 23, 2014.

TECHNICAL FIELD

The field to which the disclosure generally relates includes methods of controlling a variable spring rate absorber.

BACKGROUND

Absorbers that attenuate or dampen vibrations are employed in a variety of applications where the isolation of one mass from another is preferred. These devices often use spring-like elements that may be categorized in a variety of types but as a rule exhibit a response characteristics to input loads known as spring rate. In applications where it is desirable to adjust or vary the response characteristics of the spring-like element, the accurate and effective control of the device presents a number of challenges.

SUMMARY OF ILLUSTRATIVE VARIATIONS

In a number of illustrative variations the control of a variable spring rate absorber may include a commanding means that determines the desired absorber spring rate for existing conditions based on a number of inputs and predetermined characterization tables. Once the spring rate is calculated, a predetermined map may be used to determine the controlled device setting needed to achieve the desired spring rate. The controlled device's setting may be associated with an adjustable element that varies the spring rate by adjusting the setting. A sensor may be used to measure the actual state of the setting of the controlled device to determine the extent to which the setting must be adjusted to achieve the desired spring rate setting.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
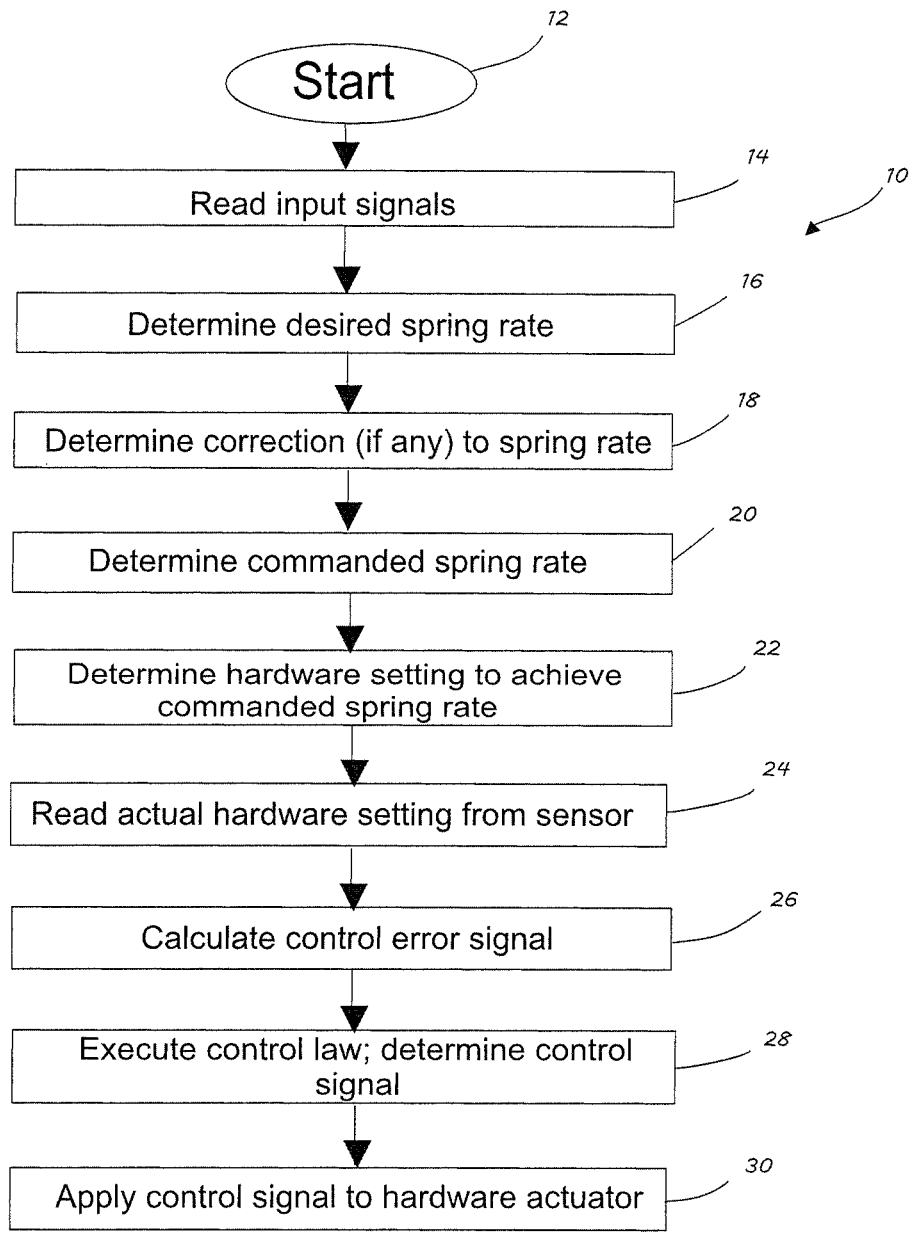
FIG. 1 is a flowchart of a method of controlling a variable spring rate absorber according to a number of variations.

FIG. 1 illustrates a number of variations which may include starting the method to initiate the spring rate adjustment routine 10 for sending a spring rate adjustment signal to a variable spring rate absorber, at start 12. Continuing, the input signals are read at box 14. The input signals may be any of a number of variables related to the operation of a product within which the absorber functions. The variables read may be those that have an effect on the generation of vibrations associated with the product and are therefore relevant to the setting determined for the absorber. Once the input signals are read the next step may be to determine a desired spring rate for the absorber based on the inputs at box 16. The determination may be made by applying the inputs to a predetermined characterization table that yields an output signal representative of the determined spring rate.

An optional correction term may be determined according to an illustrative variation at box 18. The correction term may adjust the determined spring rate based on sensed conditions. The optional correction term may adapt the control signal to account for variability in the system that is not captured in the predetermined characterization table. The correction term may be determined from a linear fit at known vibration frequencies or a spectral analysis of product inputs tuned such that the amplitude and phase or spectral power meets a predetermined requirement. Whether the correction term is employed or not, the next step may be to determine the commanded spring rate at box 20. The commanded spring rate is the rate desired to result from the absorber.

Once the commanded spring rate is calculated, the next step may be to determine the setting needed to achieve the desired spring rate in the absorber by using a predetermined map. The step of determining the hardware setting needed to achieve the commanded spring rate is initiated at box 22. A sensor is used to measure the actual hardware setting, which is read at box 24. At the next step, a control error signal may be calculated at box 26. The control error is the difference between the desired hardware setting and the actual hardware setting. Having calculated the control error, the next step may be to execute the control law and determine the control signal at box 28. The control law is tuned such that the actual hardware setting matches the desired hardware setting. The control law determines the output signal needed to move the hardware to the desired setting, which may lead to the next step which is to apply the control signal to the hardware actuator at box 30. This moves the hardware's actuator to a setting that results in the desired performance resulting from the desired spring rate. Having re-set the absorber to the desired setting the routine 10 is ready to reinitiate as needed to re-adjust the absorber.

Figure 2:
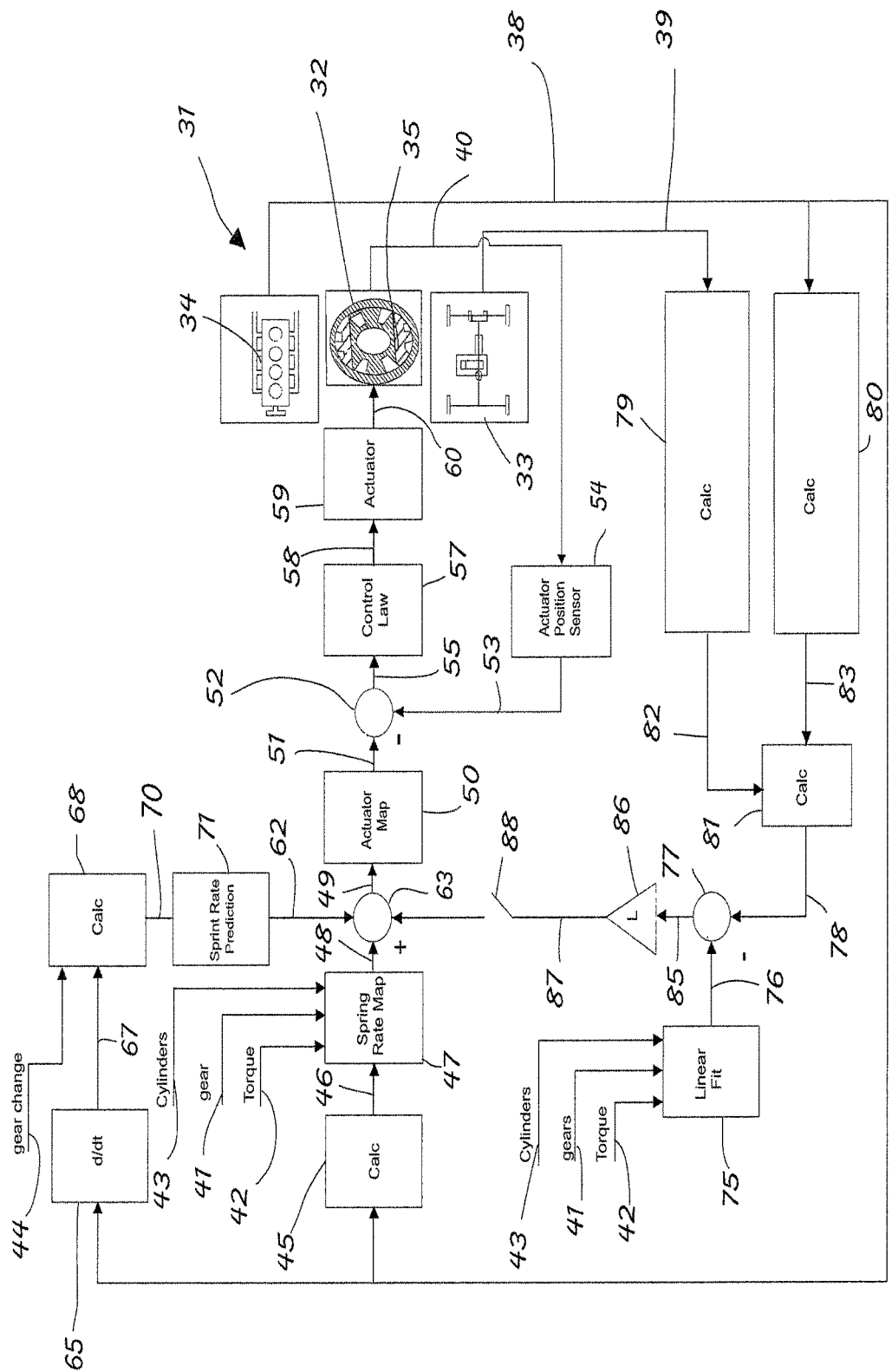
FIG. 2 is a block diagram illustrating a method of controlling a variable spring rate absorber according to a number of variations.

Referring to FIG. 2 a block diagram depicts the control of a system 31 for a variable spring rate absorber according to a number of variants. The absorber may be a torsional vibration absorber 32 for attenuating torque fluctuations in a powertrain of a vehicle 33 with engine 34 and a transmission. The absorber 32 may be disposed between the engine 34 and the transmission or within the vehicle's transmission. Absorber 32 may include a movable element or actuator 35 that is repositioned to adjust torsional stiffness or "spring rate" of the device to best attenuate vibrations at the current operating conditions of the vehicle 33.

A number of operating conditions of the vehicle 33 are sensed and communicated for use in the system 31 where the input signals are read. These may include an engine rotational speed signal 38, vehicle speed signal 39, actuator position signal 40, transmission gear signal 41; engine torque signal 42, number of engine cylinders operating signal 43, and any transmission gear change 44. The engine speed signal 38 is communicated to operator block 45 which represents the calculation of a frequency indicative of the frequency produced by the engine at the given speed. This results in a target frequency signal 46 that represents the frequency output from the engine 34 that is targeted for attenuation.

Target frequency signal 46 is delivered to operator block 47 which applies a spring rate map that, based on the input signals: target frequency 46; engine torque 42; transmission gear 41; and engine cylinders 43, determines the desired spring rate and produces a spring rate signal 48 indicative of the commanded spring rate. The spring rate signal may be delivered to operator block 50, in an unmodified form or it may be modified to spring rate signal 49 or corrected as will be described below. Operator block 50 may include an actuator map that one skilled in the art may prepare based on the specifics of the system being controlled, to provide a target actuator position signal 51. Determination of the actuator setting needed to achieve the commanded spring rate results in the target actuator position signal 51. The target represents the position of the actuator 35 targeted to provide the attenuation characteristics of the absorber 32 desired for the current operating conditions of vehicle 33.

The target actuator position signal 51 is delivered to summation block 52, which may also receive a measured actuator position signal 53 that is read from actuator position sensor block 54. The difference between the signals 51, 53 is calculated and results in error signal 55, indicative of the response needed from actuator 35 to result in the desired level of attenuation. Error signal 55 is delivered to operator block 57 that executes the control law determining control signal 58 which is applied to command the electrical current needed to reposition actuator 35 the necessary amount. The actuator may be responsive to electric current or fluid pressure or other means of motive force. In the case of a fluid pressure actuator, the control signal 58 may be delivered to operator block 59 where an electrical actuator opens a valve (not shown) to supply a pressure or flow signal 60 to move the actuator 35.

In the above described manner, an element may be adjusted an amount needed to provide the level of attenuation from absorber 32 for the current operating conditions of vehicle 33 through the steps of: reading the input signals; determining the desired spring rate; determining the commanded spring rate; determining the actuator setting needed to achieve the desired spring rate; reading the actual actuator setting; calculating a control error signal; executing the control law to determine the control signal; and applying the control signal to the hardware/actuator.

As shown in FIG. 2, the system 31 may include a second input signal—predicted spring rate signal 62—to the summation block 63 for combination with the spring rate signal 48. Signal 62 is indicative of a predicted spring rate and results from the engine speed signal 38 and gear change signal 44. The engine input signal may be delivered to operator block 65 which through differentiation computes an engine acceleration signal 67, which along with gear change signal 44 is delivered to operator block 68. At operator block 68, predicted frequency and prediction time are calculated and delivered via output signal 70 to operator block 71. At operator block 71 the signals are used in a spring rate prediction map to compute a predicted spring rate signal 62 that provides compensation for acceleration when combined with spring rate signal 48 to produce spring rate signal 49.

As shown in FIG. 2, the system 31 may include an optional third input signal: correction term signal 87, to the summation block 63 for combination with the spring rate signal 48 and if included, the predicted spring rate signal 62. An optional correction term may be determined according to an illustrative variation at box 18 of FIG. 1. The optional correction term may adapt the determined spring rate signal to account for variability in the system that is not captured in the predetermined characterization table. This variability may be determined beginning with reading the engine speed signal 38, vehicle speed signal 39, transmission gear signal 41, engine torque signal 42 and number of engine cylinders signal 43. The correction term may be determined from a linear fit at known vibration frequencies such as by application of the signals 41-43 to the operator block 75 resulting in signals 76 for target amplitude and target phase angle which are applied to summation block 77.

A second input signal 78 indicative of amplitude and phase angle from the operating conditions of the vehicle 33 may be provided to block 77.

Vehicle speed signal 39 is processed through operator block 79 and engine speed signal 38 is processed through operator block 80 where first and second amplitude and phase angle vectors are determined by calculation from vehicle speed and engine speed by using the least squares method and the relationship vehicle speed=$C*\sin(t+\square_c)$, where C is an amplitude vector, $\square_c$ is a phase angle vector, is frequency and t is time. The pairs of amplitude vectors and phase angle vectors are delivered to operator block 81 by signals 82 and 83, each of which includes data for an amplitude vector and a phase angle vector. Operator block 81 receives the data for the amplitude vector and phase angle resulting from vehicle speed and the amplitude vector and phase angle resulting from engine speed and calculates the amplitude and phase angle which are included in second input signal 78.

Summation block 77 combines the signals 76, 78 to find the difference of target amplitude and target phase angle (76), from calculated amplitude and phase angle (78) determined from vehicle speed and engine speed, producing signal 85. Signal 85 is processed through amplifier 86 which has a selected gain or scale factor producing correction term signal 87. Use of the correction term in summation block 63 is optional and enabled by closure of switch 88. When the switch is closed, the correction term signal 87 may be combined with predicted spring rate signal 62 and spring rate signal 48 to provide spring rate signal 49 which may be corrected based on vehicle operating conditions and/or modified based on a predicted rate to account for vehicle acceleration.

Figure 3:
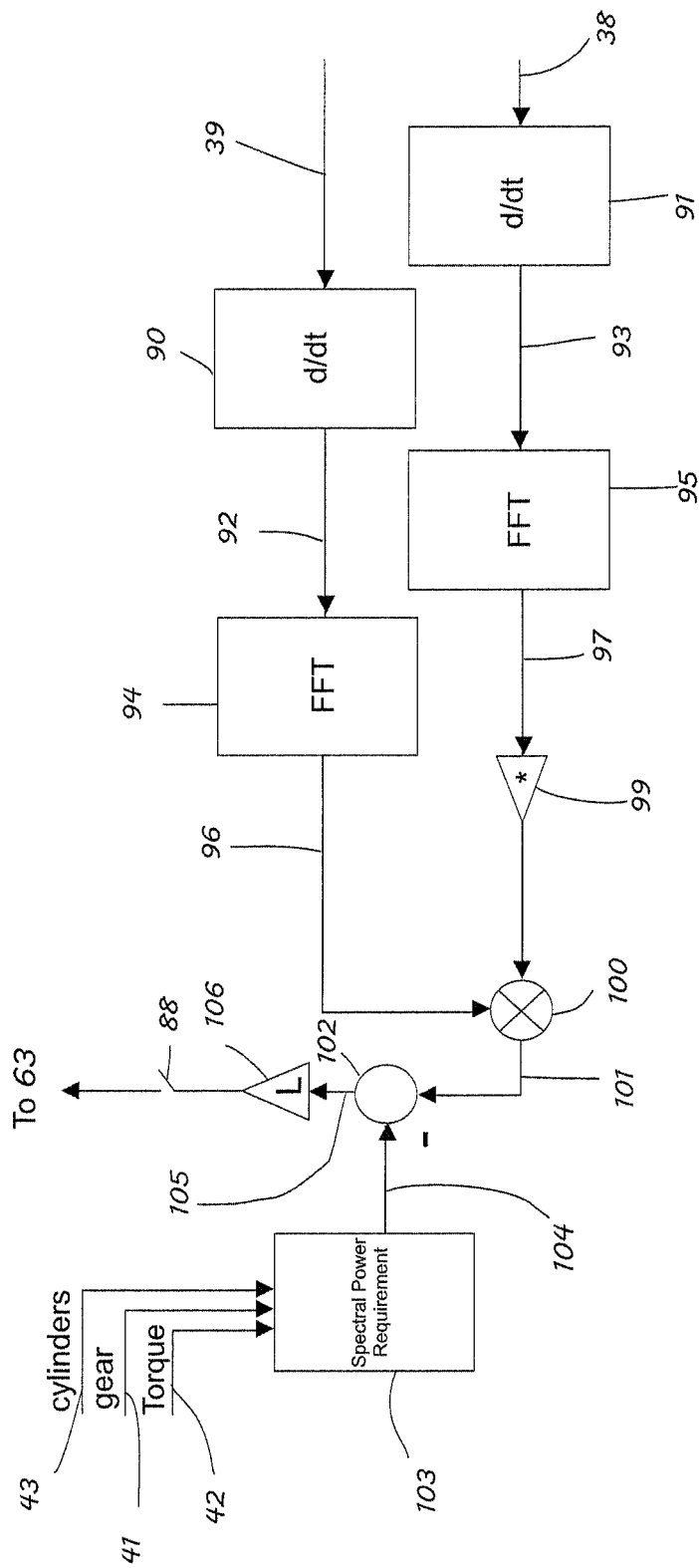
FIG. 3 is a block diagram illustrating part of a method of controlling a variable spring rate absorber according to a number of variations.

Referring to FIG. 3, the correction term may adapt the control signal to account for variability in the system that is not captured in the predetermined characterization table. The correction term may be determined based on a spectral analysis of vehicle inputs tuned such that the amplitude and phase or spectral power meets a predetermined requirement. The vehicle speed signal 39 and engine speed signal 38 are applied to operator blocks 90, 91 respectively, which differentiate the signals to produce acceleration signals 92 (for vehicle), and 93 (for engine). The acceleration signals 92, 93 are processed through operator blocks 94, 95, where through a fast fourier transform spectrum analyzer process the signals are reduced to their components, enabling the output of spectral power signals for the vehicle (96) and engine (97). The conjugate of engine speed based spectral power signal 97 is processed and denoted by 99 and provided as an input, along with vehicle speed based spectral power signal 96 to multiplication block 100. The combined spectral power signal 101 is applied to summation block 102.

A second input signal to summation block 102 is derived from the inputs: transmission gear signal 41, engine torque signal 42 and number of engine cylinders signal 43. The three signals are processed through operator block 103 and produce a spectral power signal 104 that is indicative of the spectral power requirement, which is then combined with spectral power signal 101 based on measured conditions. The difference results in correction term signal 105 that is processed through amplifier 106 and applied to summation block 63 of FIG. 2 when enabled by closure of switch 88.

The following description of variants is only illustrative of components, elements, acts, products and methods considered to be within the scope of the invention is are not in any way intended to limit such scope by what is specifically disclosed or not expressly set forth. Components, elements, acts, products and methods may be combined and rearranged other than as expressly described herein and still considered to be within the scope of the invention.

Variation 1 may include a method of controlling a variable absorber which has an actuator with a sensor. The method includes reading input signals, determining a desired spring rate for the variable absorber, determining a control setting for the actuator that achieves a commanded spring rate, reading the sensor to acquire an actual setting of the actuator, calculating a control error signal equal to the difference between the control setting and the actual setting, and using the control error signal sending a control signal to the actuator, thereby adjusting the actuator to the control setting.

Variation 2 may include a method according to variation 1 wherein the commanded spring rate is equal to the desired spring rate Variation 3 may include a method according to variation 1 wherein the desired spring rate is corrected by determining a correction term that is applied to the desired spring rate to produce the commanded spring rate.

Variation 4 may include a method according to variation 3 wherein the correction term is determined by combining a target amplitude and a target phase angle with a calculated amplitude and a calculated phase angle.

Variation 5 may include a method according to variation 3 or 4 wherein the correction term is determined from a spectral analysis of the input signals Variation 6 may include a method according to variation 3 or 4 wherein the correction term is determined using a fast fourier transform analysis.

Variation 7 may include a method according to variation 3 wherein the correction term is determined using a least squares method.

Variation 8 may include a method according to any of variations 1-7 wherein the desired spring rate is determined from a spring rate map based on the input signals.

Variation 9 may include a method according to any of variations 1-8 wherein the control setting for the actuator is determined from an actuator setting map based on the desired spring rate.

Variation 10 may include a method according to any of variations 1-9 wherein a predicted spring rate is determined and the commanded spring rate is determined by combining the predicted spring rate with the desired spring rate.

Variation 11 may include a method according to variation 3 wherein a predicted spring rate is determined and the commanded spring rate is determined by combining the predicted spring rate with the desired spring rate and the correction term.

Variation 12 may include a method for adjusting an absorber wherein the absorber has an actuator with a setting sensor. The absorber is assembled in a product with condition sensors. The method includes reading input signals from the condition sensors, determining a desired spring rate for the variable absorber based on the input signals, determining a control setting for the actuator that achieves the desired spring rate, reading the setting sensor to acquire an actual setting of the actuator, calculating a control error signal equal to the difference between the control setting and the actual setting, and using the control error signal sending a proportional control signal to the actuator, thereby adjusting the actuator to the control setting.

Variation 13 may include a method for controlling a variable absorber in a vehicle. The vehicle may include an engine and produces an engine speed signal and a vehicle speed signal. The variable absorber may have an actuator that produces an actual setting signal. The method may include reading the engine speed signal, determining a desired spring rate for the absorber from the engine speed signal, determining a commanded spring rate from the desired spring rate, determining a desired actuator setting to achieve the commanded spring rate, reading the actual setting signal, calculating a control error signal from the actuator setting and the actual setting signal, and applying the control error signal adjusting the actuator to the desired actuator setting.

Variation 14 may include a method according to variation 13 wherein the commanded spring rate is equal to the desired spring rate Variation 15 may include a method according to variation 13 wherein the desired spring rate is corrected by determining a correction term that is applied to the desired spring rate to produce the commanded spring rate.

Variation 16 may include a method according to variation 15 wherein the correction term is determined by combining a target amplitude with a calculated amplitude and combining a target phase angle with a calculated phase angle.

Variation 17 may include a method according to variation 15 or 16 wherein the correction term, specifically the calculated amplitude and phase angle are determined from a spectral analysis of the engine speed signal and the vehicle speed signal.

Variation 18 may include a method according to variation 15 or 16 wherein the correction term, specifically the calculated amplitude and phase angle are determined using a fast fourier transform analysis of the engine speed signal and the vehicle speed signal.

Variation 19 may include a method according to variation 15 wherein the correction term is determined using a least squares method analysis of the engine speed signal and the vehicle speed signal.

Variation 20 may include a method according to any of variations 13-20 wherein the desired spring rate is determined from a spring rate map based on the engine speed signal signals.

Variation 21 may include a method according to any of variations 13-20 wherein the control setting for the actuator is determined from an actuator setting map based on the desired spring rate.

Variation 22 may include a method according to variation 13 wherein a predicted spring rate is determined and the commanded spring rate is determined by combining the predicted spring rate with the desired spring rate.

Variation 23 may include a method according to variation 13 wherein a predicted spring rate is determined and the commanded spring rate is determined by combining the predicted spring rate with the desired spring rate and the correction term.

The above description of select variations within the scope of the invention is merely illustrative in nature and, thus, variations or variants thereof are not to be regarded as a departure from the spirit and scope of the invention.

What is claimed is:

1. A method of controlling a variable absorber which has an actuator with a sensor, including reading input signals, determining a desired spring rate for the variable absorber, determining a control setting for the actuator that achieves a commanded spring rate, reading the sensor to acquire an actual setting of the actuator, calculating a control error signal equal to the difference between the control setting and the actual setting, and using the control error signal sending a control signal to the actuator, thereby adjusting the actuator to the control setting.

2. A method according to claim 1 wherein the commanded spring rate is equal to the desired spring rate.

3. A method according to claim 1 wherein the desired spring rate is corrected by determining a correction term that is applied to the desired spring rate to produce the commanded spring rate.

4. A method according to claim 3 wherein the correction term is determined by combining a target amplitude and a target phase angle with a calculated amplitude and a calculated phase angle.

5. A method according to claim 3 wherein the correction term is determined from a spectral analysis of the input signals.

6. A method according to claim 3 wherein the correction term is determined using a fast fourier transform analysis.

7. A method according to claim 3 wherein the correction term is determined using a least squares method.

8. A method according to claim 1 wherein the desired spring rate is determined from a spring rate map based on the input signals.

9. A method according to claim 1 wherein the control setting for the actuator is determined from an actuator setting map based on the desired spring rate.

10. A method according to claim 1 wherein a predicted spring rate is determined and the commanded spring rate is determined by combining the predicted spring rate with the desired spring rate.

11. A method according to claim 3 wherein a predicted spring rate is determined and the commanded spring rate is determined by combining the predicted spring rate with the desired spring rate and the correction term.

12. A method for adjusting an absorber wherein the absorber has an actuator with a setting sensor and wherein the absorber is assembled in a product with condition sensors, including reading input signals from the condition sensors, determining a desired spring rate for the absorber based on the input signals, determining a control setting for the actuator that achieves the desired spring rate, reading the setting sensor to acquire an actual setting of the actuator, calculating a control error signal equal to the difference between the control setting and the actual setting, and using the control error signal sending a proportional control signal to the actuator, thereby adjusting the actuator to the control setting.

13. A method for controlling a variable absorber in a vehicle wherein the vehicle includes an engine and produces an engine speed signal and a vehicle speed signal, the variable absorber having an actuator that produces an actual setting signal including reading the engine speed signal, determining a desired spring rate for the absorber from the engine speed signal, determining a commanded spring rate from the desired spring rate, determining a desired actuator setting to achieve the commanded spring rate, reading the actual setting signal, calculating a control error signal from the actuator setting and the actual setting signal, and applying the control error signal adjusting the actuator to the desired actuator setting.

14. A method according to claim 13 wherein the commanded spring rate is equal to the desired spring rate.

15. A method according to claim 13 wherein the desired spring rate is corrected by determining a correction term that is applied to the desired spring rate to produce the commanded spring rate.

16. A method according to claim 15 wherein the correction term is determined by combining a target amplitude with a calculated amplitude and combining a target phase angle with a calculated phase angle.

17. A method according to claim 15 wherein the correction term is determined from a spectral analysis of the engine speed signal and the vehicle speed signal.

18. A method according to claim 15 wherein the correction term is determined using a fast fourier transform analysis of the engine speed signal and the vehicle speed signal.

19. A method according to claim 15 wherein the correction term is determined using a least squares method analysis of the engine speed signal and the vehicle speed signal.

20. A method according to claim 13 wherein the desired spring rate is determined from a spring rate map based on the engine speed signal signals.

21. A method according to claim 13 wherein the control setting for the actuator is determined from an actuator setting map based on the desired spring rate.

22. A method according to claim 13 wherein a predicted spring rate is determined and the commanded spring rate is determined by combining the predicted spring rate with the desired spring rate.

23. A method according to claim 13 wherein a predicted spring rate is determined and the commanded spring rate is determined by combining the predicted spring rate with the desired spring rate and the correction term.

* * * * *